US010810425B2

(12) United States Patent
Li et al.

(10) Patent No.: US 10,810,425 B2
(45) Date of Patent: Oct. 20, 2020

(54) FLIGHT VEHICLE AND FLIGHT VEHICLE TRACKING METHOD

(71) Applicant: AUTEL ROBOTICS CO., LTD., Shenzhen, Guangdong (CN)

(72) Inventors: Hongjing Li, Guangdong (CN); Jiasong Yan, Guangdong (CN); Zhihui Chen, Guangdong (CN); Yuanliang Chen, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 25 days.

(21) Appl. No.: 15/689,501

(22) Filed: Aug. 29, 2017

(65) Prior Publication Data
US 2017/0364735 A1 Dec. 21, 2017

Related U.S. Application Data

(63) Continuation of application No. PCT/CN2015/073904, filed on Mar. 9, 2015.

(51) Int. Cl.
*G06K 9/00* (2006.01)
*G06T 11/20* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC ................ G06K 9/0063; G06T 11/203; G06T 2207/30181; G05D 1/0094; G05D 1/0038;
(Continued)

(56) References Cited

U.S. PATENT DOCUMENTS 9,741,255 B1 * 8/2017 Navot ................... G08G 5/0082
2002/0101510 A1    8/2002 Basson et al.
2012/0320203 A1 * 12/2012 Liu ......................... G01C 11/04
                                                                                    348/144

FOREIGN PATENT DOCUMENTS

CN        101339244 A    1/2009
CN        101532841 A    9/2009
(Continued)

OTHER PUBLICATIONS

Noll, Daniel "Geotagging Your Photos, Part 2: Importing and Embedding GPS Data". uncornered market; archived Aug. 16, 2014.*

(Continued)

*Primary Examiner* — Michael V Kerrigan

(57) ABSTRACT

A flight vehicle and a tracking method are disclosed. The method includes: collecting the flight vehicle's geographic location information and image data of the areas over which the flight vehicle flies; establishing a correspondence between the geographic location information and the image data collected at a same moment; and sending the foregoing data between which the correspondence is established. A receive end receives the geographic location information and the image data between which the correspondence is established; draws a flight path of the flight vehicle by using the geographic location information; obtains geographic location information corresponding to a location selected on the flight path, and displays image data corresponding to the geographic location information. Therefore i's convenient to obtain a geographic location corresponding to each frame of video image, which provides a basis for tracking the trajectory of the flight vehicle, and monitoring the flight status of the flight vehicle.

17 Claims, 2 Drawing Sheets

(51) Int. Cl.
  *B64C 39/02* (2006.01)
  *B64D 47/08* (2006.01)
  *G01C 11/02* (2006.01)
  *G05D 1/00* (2006.01)

(52) U.S. Cl.
  CPC ............ *G01C 11/02* (2013.01); *G05D 1/0038* (2013.01); *G05D 1/0094* (2013.01); *G06T 11/203* (2013.01); *B64C 2201/123* (2013.01); *B64C 2201/127* (2013.01); *G06T 2207/30181* (2013.01)

(58) Field of Classification Search
  CPC ....... G01C 11/02; B64D 47/08; B64C 39/024; B64C 2201/123; B64C 2201/127
  See application file for complete search history.

(56) References Cited

FOREIGN PATENT DOCUMENTS

| | | |
|---|---|---|
| CN | 102088569 A | 6/2011 |
| CN | 102506867 A | 6/2012 |
| CN | 104284233 A | 1/2015 |

OTHER PUBLICATIONS

HPIGUY "HPIGUY | DJI Inspire 1 Flight Record & Video". YouTube. Published Jan. 27, 2015.*
The International Search Report dated Oct. 29, 2015; PCT/CN2015/073904.

* cited by examiner

FLIGHT VEHICLE AND FLIGHT VEHICLE TRACKING METHOD

CROSS-REFERENCE

This application is a continuation application of International Application No. PCT/CN2015/073904, filed Mar. 9, 2015, which is incorporated herein by reference in its entirety.

TECHNICAL FIELD

The present invention relates to video tracking technologies, and more specifically, to a flight vehicle and a flight vehicle tracking method.

BACKGROUND

A flight vehicle such as a UAV (Unmanned Aerial Vehicle) is a mechanical flying object manufactured by human, that can fly away from the ground and fly in the space, and that is controlled by human to fly in the space inside and outside the atmosphere. A UAV has advantages of low weight and small size, and is widely applied to the fields such as geographic mapping and logistics distribution. A flight distance of a UAV is relatively far, and if the UAV falls down due to an improper operation, it is difficult to find the fallen drone because of the high search difficulty. Although in an assistant method, an alarm is installed in a UAV, the alarming range of the alarm is limited.

Based on this, the Chinese Patent CN103344240A discloses an apparatus and a method for retrieving an unmanned aerial vehicle. The method includes obtaining and storing flight location information of the unmanned aerial vehicle by using a wireless network. After a request of retrieving an unmanned aerial vehicle is received, a location that is of the unmanned aerial vehicle and that is last stored is read, and then, the location of the unmanned aerial vehicle is output. In this solution, the location information of the unmanned aerial vehicle is provided to improve the retrieval efficiency of the unmanned flight vehicle. However, since the location information that is of the unmanned aerial vehicle and that is obtained in the process is longitude and latitude information, when the unmanned aerial vehicle is being searched, it is difficult to associate with an actual location scenario according to the longitude and latitude information only. Therefore, the search is difficult. In addition, in this solution, since when retrieving the unmanned aerial vehicle, only the locations of the unmanned aerial vehicle that are last stored in turn are used, a flight trajectory of the unmanned aerial vehicle cannot be reflected. Therefore, it is difficult to position a search range, and the search range is thus large.

SUMMARY

In view of this, the technical problem that needs to be resolved by the present invention is that the method for retrieving a unmanned aerial vehicle in the prior art cannot reflect an actual location scenario and a flight trajectory and that the search range is large and the search is difficult.

To resolve the foregoing technical problems, the present invention provides a flight vehicle and a flight vehicle tracking method.

An embodiment of the present invention provides a flight vehicle tracking method, including:

collecting geographic location information of the flight vehicle and image data of the areas over which the flight vehicle flies;

establishing a correspondence between the geographic location information and the image data collected at a same moment; and sending the geographic location information and the image data between which the correspondence is established.

Preferably, the step of establishing a correspondence between the geographic location information and the image data collected at a same moment includes:

marking the geographic location information in the corresponding image data.

Preferably, the step of establishing a correspondence between the geographic location information and the image data collected at a same moment includes:

reserving a storage space in the image data; and storing the geographic location information corresponding to the image data into the storage space.

Preferably, the step of collecting geographic location information of the flight vehicle includes:

obtaining longitude and latitude coordinate information of a location of the flight vehicle by using a GPS module.

Preferably, the image data further includes image data of multiple locations inside or around the flight vehicle.

Still another embodiment of the present invention provides a flight vehicle tracking method, including:

receiving geographic location information of the flight vehicle and image data of the areas over which the flight vehicle flies, wherein a correspondence is established between the geographic location information and the image data collected at a same moment;

drawing a flight path of the flight vehicle by using the geographic location information; and obtaining geographic location information corresponding to a location selected on the flight path, and displaying image data corresponding to the geographic location information.

Preferably, the step of drawing a flight path of the flight vehicle by using the geographic location information includes:

sequentially extracting, according to a collection sequence, geographic location information corresponding to each frame of image data; and marking the geographic location information on a map in chronological order, to form the flight path of the flight vehicle.

Preferably, the method further includes: displaying, after the flight vehicle is lost in contact, the map, the flight path of the flight vehicle on the map, and geographic location information and image data last sent by the flight vehicle.

Preferably, after the step of displaying, after the flight vehicle is lost in contact, the map, the flight path of the flight vehicle on the map, and geographic location information and image data last sent by the flight vehicle, the method further includes:

performing navigation according to the geographic location information last sent by the flight vehicle, and displaying a navigation route.

Preferably, after the step of receiving the geographic location information and the image data between which the correspondence is established, the method further includes:

storing the geographic location information and the image data, and overwriting the geographic location information and the image data before a preset storage time by using the geographic location information and the image data at the current moment.

Preferably, the step of obtaining geographic location information corresponding to a location selected on the flight path, and displaying image data corresponding to the geographic location information includes:

obtaining a location of a flight path selected on the map;

obtaining geographic location information corresponding to the location and image data corresponding to the geographic location information; and playing subsequent image data sequentially by using the image data as a starting point;

or, obtaining two locations of a flight path selected on the map;

obtaining geographic location information corresponding to the locations and image data corresponding to the geographic location information respectively; and playing, in chronological order, image data between the two pieces of image data.

Still another embodiment of the present invention provides a flight vehicle, including:

a processor; and a memory communicably connected with the processor, the memory storing instructions, wherein when execution of the instructions by the processor causes the processor to:

collect geographic location information of the flight vehicle and image data of the flight vehicle;

establish a correspondence between the geographic location information and the image data collected at a same moment; and send the geographic location information and the image data between which the correspondence is established.

Preferably, the execution of the instructions by the processor further causes the processor to:

reserve a storage space in the image data; and store the geographic location information corresponding to the image data into the storage space.

Still another embodiment of the present invention provides a flight vehicle, including:

a processor; and a memory communicably connected with the processor, the memory storing instructions, wherein when execution of the instructions by the processor causes the processor to:

receive geographic location information of the flight vehicle and image data of the areas over which the flight vehicle flies, wherein a correspondence is established between the geographic location information and the image data collected at a same moment;

draw a flight path of the flight vehicle on a map by using the geographic location information; and obtain, according to a location selected on the map, the geographic location information corresponding to the location, and fetch image data corresponding to the geographic location information for display.

Preferably, the execution of the instructions by the processor further causes the processor to:

sequentially extract, according to a collection sequence, geographic location information corresponding to each frame of image data; and mark the geographic location information on a map in chronological order, to form the flight path of the flight vehicle.

Preferably, the execution of the instructions by the processor further causes the processor to:

display, after the flight vehicle losses in contact, the map, the flight path of the flight vehicle on the map, and geographic location information and image data last sent by the flight vehicle.

Preferably, after display, after the flight vehicle losses in contact, the map, the flight path of the flight vehicle on the map, and geographic location information and image data last sent by the flight vehicle, the execution of the instructions by the processor further causes the processor to:

perform navigation according to the geographic location information last sent by the flight vehicle, and display a navigation route.

Preferably, the execution of the instructions by the processor further causes the processor to: store the geographic location information and the image data, and overwrite the geographic location information and the image data before a preset storage time by using the geographic location information and the image data at the current moment.

Preferably, the execution of the instructions by the processor further causes the processor to:

obtain a location of the flight path selected on the map;

obtain geographic location information corresponding to the location and image data corresponding to the geographic location information; and play subsequent image data sequentially by using the image data as a starting point;

or, obtain two locations of the flight path selected on the map;

obtain geographic location information corresponding to the locations and image data corresponding to the geographic location information respectively; and play, in chronological order, image data between the two pieces of image data.

Still another embodiment of the present invention provides a non-volatile computer storage medium. The non-transitory computer-readable storage medium stores computer executable instructions, wherein when the computer executable instructions are executed by a processor, causes the processor to:

receive geographic location information of the flight vehicle and image data of the areas over which the flight vehicle flies, wherein a correspondence is established between the geographic location information and the image data collected at a same moment;

draw a flight path of the flight vehicle by using the geographic location information;

and obtain geographic location information corresponding to a location selected on the flight path, and display image data corresponding to the geographic location information.

Compared with the prior art, the foregoing technical solution of the present invention has the following advantages:

(1) The present invention provides a flight vehicle tracking method and system, which are used in a flight vehicle end. Firstly, geographic location information of the flight vehicle and image data of the areas over which the flight vehicle flies are collected. Then, a correspondence between the geographic location information and the image data collected at a same moment is established. Finally, the foregoing data between which the correspondence is established is sent. In the solution, the correspondence between the geographic location information and the image data is established, and geographic location information corresponding to each frame of image is added to video information. In this way, subsequently, it is convenient to obtain a geographic location corresponding to each frame of video image, which provides a basis for tracking the trajectory of the flight vehicle and monitoring the flight status of the flight vehicle.

(2) In the flight vehicle tracking method and system of the present invention, when the correspondence between the geographic location information and the image data collected at a same moment is established, the geographic location information is marked in the corresponding image data. For example, a storage space may be reserved in the image data, and the geographic location information corresponding to the image data is stored into the storage space. In this way, the geographic location information may be simply and directly associated with each frame of image data. When data is invoked subsequently, the corresponding geographic location information or image data may be directly obtained, the data amount is reduced, and the transmission speed is improved.

(3) The present invention provides a flight vehicle tracking method and system, which are used in a user terminal. Geographic location information and image data between which a correspondence is established and that are sent by a flight vehicle end are received. Firstly, a flight path of the flight vehicle is drawn on a map according to the geographic location information and a time sequence. Then, according to a location selected on the map, geographic location information corresponding to the location is obtained, and the corresponding image data is displayed. In this way, not only the path of the flight vehicle may be obtained on the map clearly, but also the video information of the flight process of the flight vehicle may be played according to the selected location. Thus the user terminal can track the flight vehicle effectively, and obtain the status of the flight vehicle in real time, so as to discover a problem and process the problem in time.

(4) In the flight vehicle tracking method and system of the present invention, according to the location selected on the map by the user terminal, a flight vehicle video of the location may be played. For example, when a location is selected, a video image of the flight vehicle at the location may be played. When two locations are selected, a video image of the flight vehicle between the two locations may be played. Thus the video image of the flight vehicle may be positioned and played back according to a requirement. A problem in the prior art that a video image is played and shot in a time dimension, and the corresponding video information can only be obtained by using corresponding time may be avoid. Therefore, the video image of the flight vehicle can be positioned and played back more conveniently and rapidly.

(5) In the flight vehicle tracking method and system of the present invention, after the geographic location information and the image data between which the correspondence is established and that are sent by the drone end reach the user terminal, the user terminal receives and stores the geographic location information and the image data into a storage medium. A storage time period is preset in the user terminal, and the image data before the preset storage time is overwritten by the image data received by the user terminal later. In this way, the user terminal only needs to store data in the latest preset time period, a lot of redundant data without high value does not need to be stored, and the data storage amount can be reduced.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

To make a person skilled in the art better understand the content of the present invention, the following further describes the technical solution provided in the present invention in detail with reference to the accompanying drawings and embodiments. A flight vehicle in this embodiment may be a drone or another flight device that may be controlled remotely.

Embodiment 1

Figure 1:
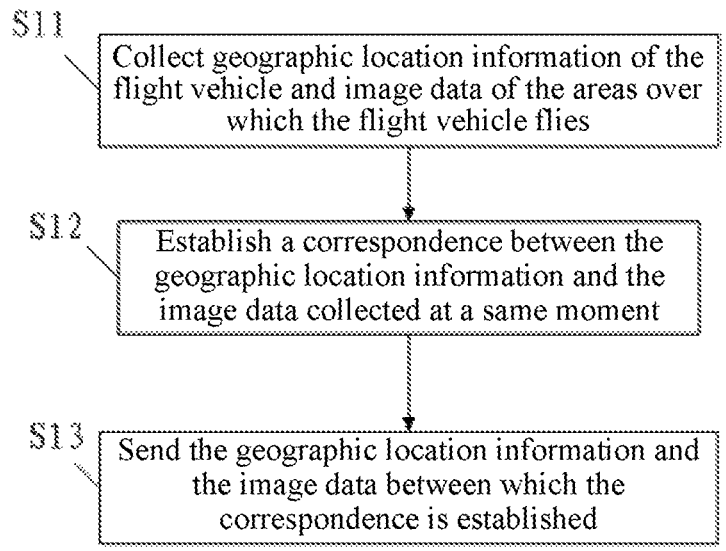
FIG. 1 is a flowchart of a flight vehicle tracking method according to Embodiment 1 of the present invention.

As shown in FIG. 1, a flight vehicle tracking method in this embodiment is used in a flight vehicle end, and includes the following steps:

S11. Collect geographic location information of the flight vehicle and image data of the areas over which the flight vehicle flies.

Preferably, the geographic location information of the flight vehicle may be obtained by using a GPS module. Longitude and latitude coordinate information of a location of the flight vehicle is obtained by the GPS module. The longitude and latitude coordinate information is used as the geographic location information of the flight vehicle. A space location of the flight vehicle may be positioned by using the longitude and latitude coordinate information. Generally, the image data of the areas over which the flight vehicle flies may be obtained by disposed one or more cameras at different locations of the flight vehicle. For example, one or more cameras may be disposed at the lower side of the flight vehicle to obtain an overlooked image of the ground below the flight area. Or, one or more cameras may be disposed around the inside or outside of the flight vehicle to obtain image data inside the flight vehicle. Or, video images of the front side, the back side, and the lower side of the outside of the flight vehicle, or video images of any one or more angles. In addition, images collected by the cameras at multiple locations may be further put together to restore a flight environment of the flight vehicle. A disposing location and a shooting location of a camera are set according to requirements, and the objective is to reflect an environment around the flight vehicle, so as to track the flight vehicle efficiently.

S12. Establish a correspondence between the geographic location information and the image data collected at a same moment.

In the step, two types of information, such as the geographic location information obtained by using the GPS module and the image data collected by using the cameras need to be associated, so as to determine which part of the video image the coordinates of the location of the flight vehicle correspond to. In the step, the correspondence between the geographic location information and the image data collected at a same moment is established. In this way, a corresponding video image may be obtained by using fixed geographic location coordinate information. The corresponding to geographic location coordinate information may also be obtained by using a fixed video image.

To simplify the data amount, in this embodiment, the geographic location information is marked in the corresponding image data. Specifically, a storage space such as a grid is reserved in the image data, and geographic location information corresponding to the image data is stored into the grid. In this way, the geographic location information and the image data between which the correspondence is established may be obtained simply and conveniently. It is also very convenient to invoke the geographic location information subsequently. The geographic location information can be directly read at a preset grid location.

In another alternative implementation solution, the geographic location information and the image data may be stored independently. And marking information of the correspondence between them may be increased, provided that the geographic location information and the image data at a same moment can be mutually searched. However, compared with the foregoing manner of marking the geographic location information in the corresponding image data, both the data storage amount and the data transmission amount in the manner are increased.

S13. Send the geographic location information and the image data between which the correspondence is established.

Because in the foregoing step S12, the geographic location information (that is, coordinate information) is marked in the corresponding image data, in this step, only the image data marked with the geographic location information needs to be sent. As can be seen, the marking manner in step S12 may be used to reduce the data transmission amount.

In the flight vehicle tracking method of this embodiment, a video is shot by using a flight vehicle, to provide a basis for a user terminal to track the flight vehicle, and create a condition for retrieving the flight vehicle in a special case such as when the flight vehicle falls down, thereby improving the search efficiency. In the solution, the correspondence between the geographic location information and the image data is established, and geographic location information corresponding to each frame of image is added to video information. In this way, subsequently, it is convenient to obtain a geographic location corresponding to each frame of video image, which provides a basis for tracking a trajectory of the flight vehicle, and monitoring the flight status of the flight vehicle.

Embodiment 2

Figure 2:
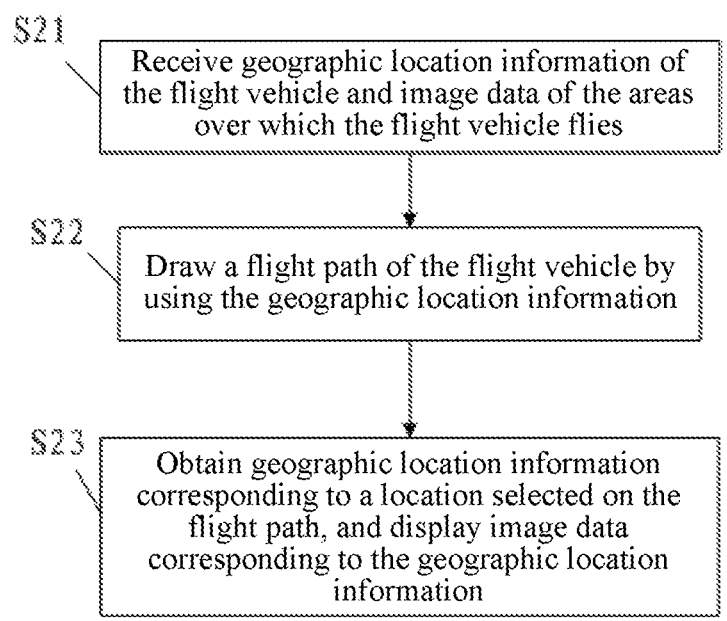
FIG. 2 is a flowchart of a flight vehicle tracking method according to Embodiment 2 of the present invention.

This embodiment provides a flight vehicle tracking method, used in a user terminal, so that an operator can track a flight vehicle. The method corresponds to the tracking method in Embodiment 1, which obtain the data sent by a flight vehicle end in Embodiment 1 and restores and processes the same thereafter. The user terminal herein may be a computer or a server with the following functions. A flowchart of the light vehicle tracking method in this embodiment is shown in FIG. 2, and the method includes:

S21. Receive geographic location information of the flight vehicle and image data of the areas over which the flight vehicle flies, where a correspondence is established between the geographic location information and the image data collected at a same moment. Because in Embodiment 1, the geographic location information is marked in the corresponding image data, and the image data marked with the geographic location information is sent, in the step, the image data marked with the geographic location information is received.

S22. Draw a flight path of the flight vehicle on a map by using the geographic location information. Because the geographic location information is stored in a grid of the image data, geographic location information in each frame of image is sequentially extracted according to a shooting sequence, and the coordinate longitude and latitude information is marked on the map in chronological order, so that the flight path of the flight vehicle is drawn.

S23. Obtain geographic location information corresponding to a location selected on the flight path, obtain, according to the location selected on the map, the geographic location information corresponding to the location, and display the image data corresponding to the geographic location information.

At the user terminal, when the status of the flight vehicle needs to be learned, a user may select a location on the map, watch a video image of the flight vehicle at the location, and learn the flight status of the flight vehicle at the current location. Since the video image may record images shot from the inside and outside environment of the flight vehicle, by fetching the video image, the flight status at that time maybe truly reconstructed, which facilitates subsequent tracking and inspection.

At this point, after obtaining a location on the flight path selected on the map by the user, the user terminal fetches geographic location information (longitude and latitude coordinate information) corresponding to the location on the map, and the corresponding image data may be obtained according to the geographic location information, and then, image data of the location may be played, or subsequent image data is played sequentially by using the location of the image data as a starting point, to obtain the video image.

In addition, the user may further select two locations on the flight path of the flight vehicle on the map as a starting point and an ending point, and watch a video image between these two locations. At this point, the user terminal first needs to obtain two locations on the flight path selected on the map by the user, longitude and latitude coordinate information corresponding to the two locations may be obtained according to actual coordinates corresponding to the location on the map, and image data corresponding to the location information may be obtained according to the longitude and latitude coordinate information. Then, according to a shooting sequence of the images, image data between the two pieces of image data is played in chronological order. In this way, the video image between the two locations may be played for the user according to the two locations specified by the user.

When the video image is played, a playing speed may be determined according to a user selection. For example, play, pause, last forward, and fast backward keys are disposed on the user terminal. Alternatively, a touch screen may be disposed on the user terminal, and the playing speed is determined by using gestures. In addition, a touch screen may be further disposed on the user terminal, and when a finger is pressed on the touch screen, the corresponding image data is played at a point nearest to the path on map. When the finger is released, playing is stopped. When the finger is pressed on the touch screen, playing is performed. The playing speed is determined by a finger dragging speed. In the solution, since a central platform or a coder is not needed, playing is performed directly on the user terminal, the efficiency is high and the real-time degree is high.

In addition, because all geographic location information and image data between which correspondences are established and that are sent by the drone end are always stored, it definitely cause a huge data amount, and a required storage space is also very large. However, in fact, generally data in the current period of time is relatively important and has an important effect on the current status of tracking a unmanned aerial vehicle, whereas data that are stored a long time ago has less effects. Therefore, in a preferable implementation solution, after receiving the image data, the user terminal stores the geographic location information and the image data, and overwrites the geographic location information and the image data before a preset storage time by using the geographic location information and the image data at the current moment. Specifically, after receiving the image data, the user terminal stores the image data into a storage medium, and a storage time period is further preset in the user terminal, for example, is set to 30 minutes, 1 hour, 2 hours, or 3 hours. The storage time period is selected according to requirements. The image data before the preset storage time period is overwritten by the image data received by the user terminal later. For example, when the preset storage time period is set to 2 hours, image data 2 hours ago may be overwritten when the current image data of the user terminal is stored. In this way, only data in a latest period of time needs to be stored in the user terminal, and redundant data without high value does not need to be stored. Thus the data storage amount can be reduced.

By using the foregoing manner, a flight process of the flight vehicle may be monitored and tracked effectively. In this way, not only the path of the flight vehicle may be obtained on the map clearly, but also video information of a flight process of the flight vehicle may be played according to the selected location. Thus the user terminal can track the flight vehicle effectively, and obtain the status of the flight vehicle in real time, so as to discover a problem and process the problem in time.

Based on the foregoing, after the flight vehicle is lost in contact, the map, the flight path of the flight vehicle on the map, and geographic location information and image data last sent by the flight vehicle may be displayed on the user terminal, then, navigation is performed according to the geographic location information last sent by the flight vehicle, and a navigation route is displayed. Three transportation manners walking/bus/driving may be displayed on the user terminal, so as to find the flight vehicle in time. The manner makes it more convenient to retrieve the flight vehicle, and improves the retrieval success rate. It is easier to find the flight vehicle that is lost in contact by using the flight path and the image last played. In remote areas, the navigation function improves the search efficiency.

Embodiment 3

Figure 3:
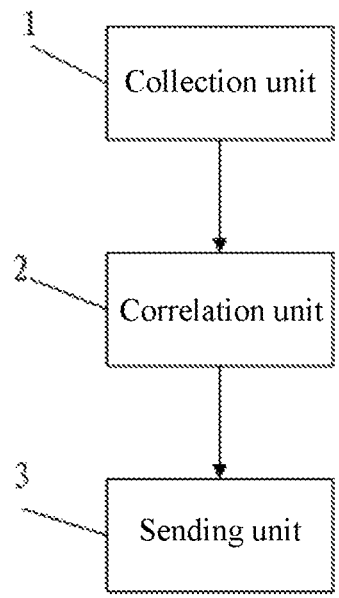
FIG. 3 is a structural diagram of a flight vehicle tracking system according to Embodiment 3 of the present invention.

This embodiment provides a flight vehicle tracking system, which is disposed on a unmanned aerial vehicle, and uses the flight vehicle tracking method in Embodiment 1. A structural block diagram of the flight vehicle tracking system is shown in FIG. 3, and the system includes:

a collection unit 1, configured to collect geographic location information of the flight vehicle and image data of the areas over which the flight vehicle flies. Specifically, the collection unit 1 obtains longitude and latitude coordinate information of a location of the flight vehicle by using a GPS module, and collect image data inside the flight vehicle and image data at one or more locations around the flight vehicle by using cameras;

an correlation unit 2, configured to establish a correspondence between the geographic location information and the image data collected at a same moment; and a sending unit 3, configured to send the geographic location information and the image data between which the correspondence is established.

The correlation unit 2 includes:

a storage module, configured to reserve a storage space in the image data; and a marking module, configured to store the geographic location information corresponding to the image data into the storage space.

In the flight vehicle tracking system in this embodiment, the correspondence between the geographic location information and the image data is established, and geographic location information corresponding to each frame of image is added to video information. In this way, subsequently, it is convenient to obtain a geographic location corresponding to each frame of video image, which provides a basis for tracking the trajectory of the flight vehicle, and monitoring the flight status of the flight vehicle.

Embodiment 4

Figure 4:
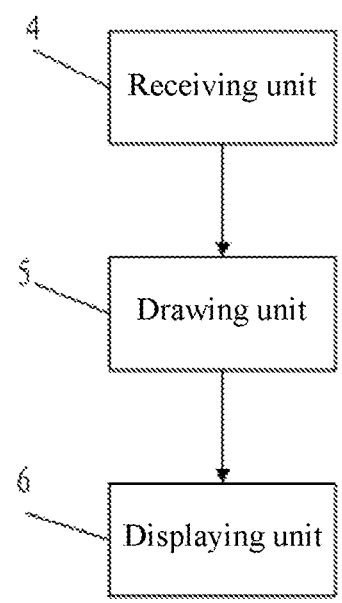
FIG. 4 is a structural diagram of a flight vehicle tracking system according to Embodiment 4 of the present invention.

This embodiment provides a flight vehicle tracking system, which is used in a user terminal, and uses the flight vehicle tracking method in Embodiment 2. A structural block diagram of the flight vehicle tracking system is shown in FIG. 4, and the system includes:

a receiving unit 4, configured to receive geographic location information of the flight vehicle and image data of the areas over which the flight vehicle flies, wherein a correspondence is established between the geographic location information and the image data collected at a same moment;

a drawing unit 5, configured to draw a flight path of the flight vehicle on a map by using the geographic location information; and a displaying unit 6, configured to obtain, according to a location selected on the map, the geographic location information corresponding to the location, and fetch image data corresponding to the geographic location information for display.

The drawing unit 5 includes:

an extraction module, configured to sequentially extract, according to a collection sequence, geographic location information corresponding to each frame of image data; and a path drawing submodule, configured to mark the geographic location information on a map in chronological order, to form the flight path of the flight vehicle.

In another implementation solution, the system further includes a contact lost displaying unit, configured to display, after the flight vehicle is lost in contact, the map, the flight path of the flight vehicle on the map, and geographic location information and image data last sent by the flight vehicle. The system may further be disposed with a navigation unit, configured to perform navigation according to the geographic location information last sent by the flight vehicle, and display a navigation route. The navigation route may include: a bus route, a driving route, and a walking route, to better help an operator to determine and retrieve the route of the flight vehicle.

In this embodiment, the displaying unit 6 includes a single-point displaying subunit, including:

a single-point location obtaining module, configured to obtain a location of a flight path selected on the map;

a single-point image obtaining module, configured to obtain geographic location information corresponding to the location and image data corresponding to the geographic location information;

a single-point playing module, configured to play subsequent image data sequentially by using the image data as a starting point;

In another implementation solution, the displaying unit 6 may further include a two-point display subunit, which specifically includes:

a two-point location obtaining module, configured to obtain two locations of a flight path selected on the map;

a two-point image obtaining module, configured to obtain geographic location information corresponding to the locations and image data corresponding to the geographic location information respectively; and a two-point playing module, configured to play, in chronological order, image data between the two pieces of image data.

In a preferable implementation solution, the system further includes a receiving and storage subunit, configured to store the geographic location information and the image data, and overwrite the geographic location information and the image data before a preset storage time by using the geographic location information and the image data at the current moment. In the solution, the geographic location information and the image data between which the correspondence is established are stored in a storage medium, and a storage time period is preset. The image data before the preset storage time is overwritten by the foregoing data received later, to reduce the stored data amount, and improve the data storage use efficiency.

In the flight vehicle tracking system disposed in the user terminal, not only the path of the flight vehicle may be obtained on the map clearly, but also video information of a flight process of the flight vehicle may be played according to the selected location. Thus the user terminal can track the flight vehicle effectively, and obtain the status of the flight vehicle in real time, so as to discover a problem and process the problem in time.

Obviously, the foregoing embodiments are merely examples made for clear description, but are not limitations to the implementations. For a person of ordinary skill in the art, other different forms of changes or variations may further be made based on the foregoing description. Herein, all implementations do not need to or cannot be enumerated. The obvious changes or variations derived therefrom are still within the protection scope of the present invention.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine. Thus the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

What is claimed is:

1. A flight vehicle tracking method, including:

sending, by a flight vehicle, geographic location information of the flight vehicle and image data of areas over which the flight vehicle flies, wherein a correspondence is established between the geographic location information of the flight vehicle and the image data collected by the flight vehicle at a same moment;

receiving, by a user terminal, the geographic location information of the flight vehicle and the image data corresponding to the geographic location information;

drawing, by the user terminal, a flight path of the flight vehicle on a map, according to the geographic location information sent by the flight vehicle; and navigating a user, by the user terminal, according to the flight path, geographic location information and image data corresponding to the geographic location information last sent by the flight vehicle to find the flight vehicle when the flight vehicle is lost;

wherein the method further comprises:

overwriting, by the user terminal, geographic location information and image data stored before a preset storage time with geographic location information and image data collected by the flight vehicle at a current moment.

2. The flight vehicle tracking method according to claim 1, wherein the step of drawing, by the user terminal, the flight path of the flight vehicle on the map, according to the geographic location information sent by the flight vehicle includes:

sequentially extracting, by the user terminal, according to a collection sequence of the image data, the geographic location information corresponding to each frame of the image data; and marking, by the user terminal, the geographic location information on the map in chronological order according to the collection sequence of the image data, to form the flight path of the flight vehicle.

3. The flight vehicle tracking method according to claim 1, further including: displaying, by the user terminal, the map, the flight path of the flight vehicle on the map, and the geographic location information and the image data corresponding to the geographic location information last sent by the flight vehicle.

4. The flight vehicle tracking method according to claim 1, further including:

obtaining, by the user terminal, a location of the flight path on the map selected by the user;

obtaining, by the user terminal, geographic location information and image data of the location; and playing, by the user terminal, subsequent image data sequentially by using the image data of the location of the flight path selected by the user as a starting point.

5. The flight vehicle tracking method according to claim 1, further including:

obtaining, by the user terminal, a first location and a second location of the flight path on the map selected by the user;

obtaining, by the user terminal, a first image data of the first location and a second image data of the second location; and playing, by the user terminal, image data between the first image data and the second image data in chronological order.

6. The flight vehicle tracking method according to claim 1, wherein the geographic location information is marked in the image data collected by the flight vehicle at the same moment.

7. The flight vehicle tracking method according to claim 1, wherein the geographic location information comprises longitude and latitude coordinate information of the flight vehicle.

8. The flight vehicle tracking method according to claim 1, wherein the image data comprises image data of multiple locations inside or around the flight vehicle.

9. A non-volatile computer storage medium storing computer executable instructions, wherein when the computer executable instructions are executed by a processor, causes the processor to perform the flight vehicle tracking method of claim 1.

10. A flight vehicle system, comprising a flight vehicle and a user terminal wirelessly communicating with the flight vehicle;

wherein the flight vehicle is configured to:

send geographic location information of the flight vehicle and image data of areas over which the flight vehicle files, wherein a correspondence is established between the geographic location information of the flight vehicle and the image data collected by the flight vehicle a same moment;

wherein the user terminal is configured to:

receive the geographic location information of the flight vehicle and the image data corresponding to the geographic location information;

draw a flight path of the flight vehicle on a map according to the geographic location information sent by the flight vehicle; and navigate a user according to the flight path, geographic location information and image data corresponding to the geographic location information last sent by the flight vehicle to find the flight vehicle when the flight vehicle is lost;

wherein the user terminal is further configured to:

overwrite geographic location information and image data stored before a preset storage time ng with geographic location information and image data collected by the flight vehicle at a current moment.

11. The flight vehicle system according to claim 10, wherein the user terminal is further configured to:

sequentially extract, according to a collection sequence of the image data, the geographic location information corresponding to each frame of the image data; and mark the geographic location information on the map in chronological order according to the collection sequence of the image data, to form the flight path of the flight vehicle.

12. The flight vehicle system according to claim 10, wherein the user terminal is further configured to:

display the map, the flight path of the flight vehicle on the map, and the geographic location information and the image data corresponding to the geographic location information last sent by the flight vehicle.

13. The flight vehicle system according to claim 10, wherein the user terminal is further configured to:

obtain a location of the flight path on the map selected by the user;

obtain geographic location information and image data of the location; and play subsequent image data sequentially by using the image data of the location as a starting point.

14. The flight vehicle system according to claim 10, wherein the user terminal is further configured to:

obtain a first location and a second location of the flight path on the map selected by the user on the map;

obtain a first image data of the first location and a second image data of the second location; and play image data between the first image data and the second image data in chronological order.

15. The flight vehicle system according to claim 10, wherein the geographic location information is marked in the image data collected by the flight vehicle at the same moment.

16. The flight vehicle system according to claim 10, wherein the geographic location information comprises longitude and latitude coordinate information of the flight vehicle.

17. The flight vehicle tracking method according to claim 10, wherein the image data comprises image data of multiple locations inside or around the flight vehicle.

* * * * *